Aug. 28, 1945.  A. W. SPICER  2,383,623
RIVETED STRUCTURE
Filed May 12, 1943

Inventor
Alvin W. Spicer
By Willis F. Avery
Atty.

Patented Aug. 28, 1945

2,383,623

UNITED STATES PATENT OFFICE 2,383,623

RIVETED STRUCTURE

Alvin W. Spicer, Cuyahoga Falls, Ohio, assignor to The B. F. Goodrich Company, New York, N. Y., a corporation of New York Application May 12, 1943, Serial No. 486,719

3 Claims. (Cl. 218—29)

This invention relates to riveted structures and more particularly to the riveting of non-metallic wall structures with hollow collapsible threaded rivets.

In the securing of ice removing equipment and other structures to the skin of aircraft and for securing parts to other wall structures, tubular collapsible threaded rivets of the type shown for example in Waner Patent No. 2,149,199 have been employed. These have been secured through openings drilled through the metal skin, and key lugs have been provided on the shanks of the rivets for securing them against rotation, the metal of the skin engaged by the rivets having been provided with keyways to receive the keys. When it has been attempted to secured such rivets to non-metallic skin or wall materials, such as plywood or wood veneer or fabric impregnated with thermoplastic or thermosetting materials, difficulties have been encountered due to the fact that such non-metallic materials have not always had sufficient strength about the rivet holes to prevent the expanded portion of the rivet shank from tearing through the material when the rivet was upset, have not held the hollow rivets securely against rotation, and have not been susceptible to ready provision of preformed keyways.

The principal objects of the present invention are to provide for strong attachment of the rivet despite weakness of the material of the non-metallic wall to hold the rivet, to provide effective metallic reinforcement of the non-metallic wall at the zone engaged by the rivet, to form interlocking means on the rivet during the upsetting of the rivet for engaging the metallic reinforcement, and to provide a single means for the interlocking of a plurality of rivets.

These and other objects will appear from the following description and accompanying drawing.

Figure 1:
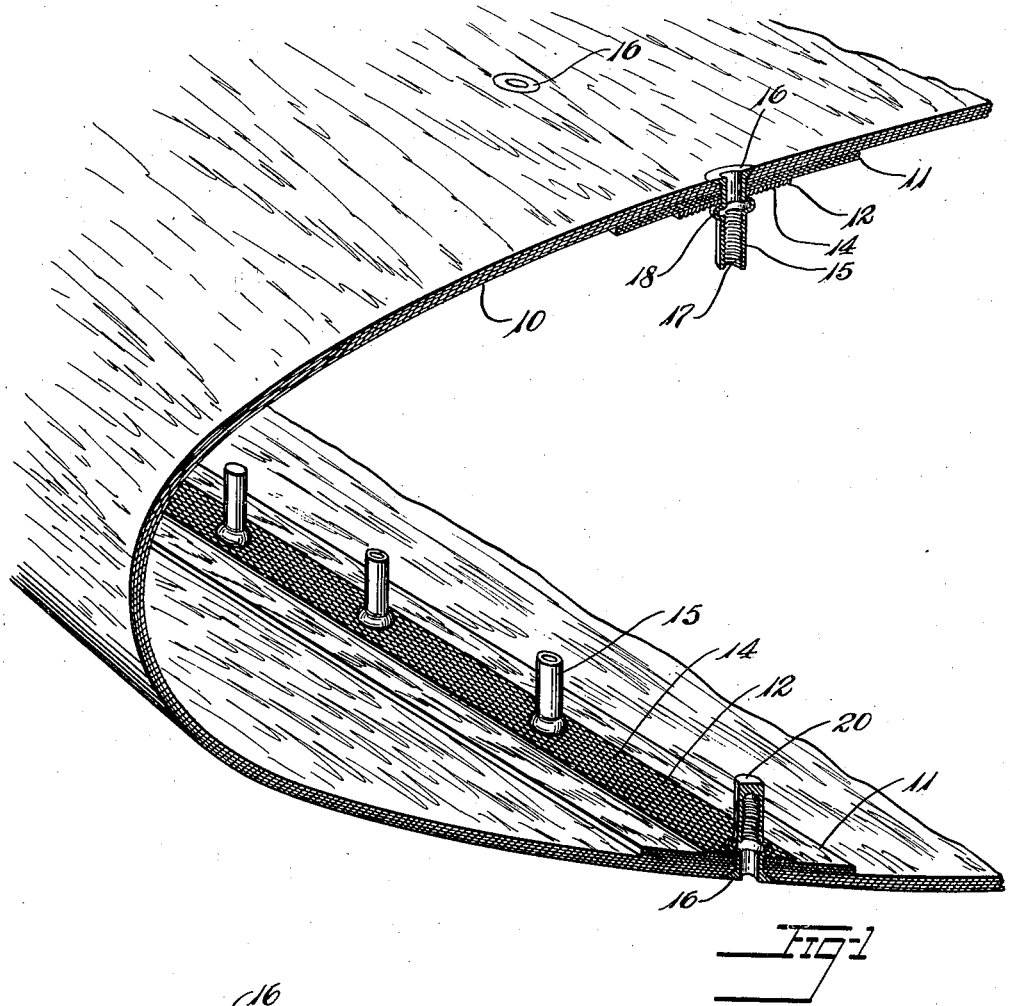
Fig. 1 is a perspective view of a section of an airplane wing with a plurality of metal rivets secured thereto.
Figure 2:
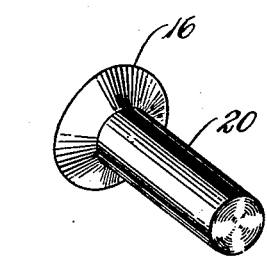
Fig. 2 is a perspective view of a rivet.

In accordance with the invention, a reinforcing strip of metal is applied and preferably secured against the rear face of the non-metallic wall, apertures are formed in the wall and the reinforcement either prior to or after such application, the rivets are inserted and upset or expanded in place, and during upsetting of the rivets, the material of the upset portion is formed to interlock with a rough surface of the metallic reinforcement.

Referring to the drawing, which shows an illustrative embodiment of the invention, the numeral 10 designates the skin of an airplane wing formed of non-metallic laminated material such as plywood. Secured along the inner surface of the skin is a reinforcing strip 11 of plywood, and on its face is a strip 12 of sheet metal having a knurled or otherwise suitably roughened exposed surface 14.

The metal strip 12 is preferably secured to the skin structure, as by cement or by being molded therewith so as to adhere thereto, although a separate strip may be employed if desired. When the wing section is molded by pressing wood veneer and resinous material together with heat and high molding pressure, the strip 12 may be assembled with the other materials before the molding operation and will be adhered by the resinous material. The wing is drilled at intervals along the reinforcing strip of metal to receive the rivets 15. These rivets are of tubular form and preferably have a conical flange 16 at one end for counter-sunk application. The other end of the rivet is interiorly threaded as at 17. This enables the rivet to be upset by a draw-rod extending through the body of the rivet and engaging the threads to compress the tubular wall of the rivet axially as at 18 between the flange and the threaded portion. The upset portion 18 is conformed by the pressure in this operation to the surface 14 of the metal strip 12, thereby keying it to the strip against rotation. Preferably the metal strip 12 is knurled to provide closely spaced upstanding teeth. However, a ribbed or grooved strip, a perforated metal strip, wire cloth of coarse mesh, or other suitable form of metal strip may be employed, it being desired that the strip provide adjacent areas of different altitude so that when the metal of the rivet is collapsed the displaced metal is forced into the deeper areas of the face of the metal strip to form key elements for interlocking the rivet to the strip. While a knurled surface 14 has been shown in the drawing it will be understood that other surfaces also, having regular or irregular elevations or depressions which will permit interlocking of the rivet, whether ribbed, grooved, embosssed, or otherwise provided, are intended to be included in the term "rough."

The metal strip 12 not only provides for locking the rivet against rotation, but also resists loosening of fibers about the rivet apertures and reinforces the plywood wall against splitting or crushing due to forces applied in securing the rivet in place or in fastening parts to the collapsed rivet.

The rivet shown at 15 is of an open ended construction. Rivet 20 is identical therewith except that the threaded opening does not extend entirely through the rivet, leaving a closed end. With either type, ice-removing equipment or other parts may be secured to the airplane by screws entering through the hollow flanged end of the rivet and engaging the threaded body of the rivet. Either flat-headed or countersunk head rivets may be employed, although the tapered countersunk head of the illustrated embodiment has the advantage, in conjunction with the backing plate 12, of crowding the fibers of the non-metallic material by a wedging action, thereby increasing the strength of the material in the region of the rivet, and the countersunk-head type of rivet is preferred in applying ice-removing apparatus to airfoils and in other locations where projecting heads would increase friction. The apertures for receiving the rivets may be countersunk to receive the heads and the largest diameter of the countersink is preferably made less than the diameter of the rivet head so that the margin of the rivet head engages slightly over the exposed fiber ends at the surface of the airfoil and binds them in position while also preventing entrance of moisture to these exposed fiber ends. Such binding and sealing of the ends of the fibers may be further facilitated by relieving either the metal of the rivet or material to which it is to be secured from the shank of the rivet outwardly but short of the periphery of its countersunk head so that greatest pressure is sustained, and first contact in assembling occurs, at the periphery of the head.

Variations may be made without departing from the scope of the invention as it is defined by the following claims.

I claim:

1. A structure comprising a wall of non-metallic material, a reinforcement of rough-faced metal on one face of said wall, said wall and said reinforcement having aligned openings, and a hollow tubular rivet extending through said openings, said rivet having an upset portion engaging said reinforcement and interlocked with the rough face thereof.

2. A structure comprising a wall of molded non-metallic material, a reinforcement therefore of rough-faced metal at one face of said wall, said wall and said reinforcement having aligned openings, and a hollow tubular rivet extending through said openings, said rivet having a head engaging against the non-metallic material of the other face of said wall and an upset portion engaging said reinforcement and interlocked with the rough face thereof.

3. A structure comprising a wall of molded non-metallic material, a strip reinforcement therefore of rough-faced sheet metal adhered to one face of said wall, said wall and said reinforcement having a series of aligned openings, and hollow tubular rivets extending through said openings, said rivets each having a head engaging against the non-metallic material of the other face of said wall and an upset portion engaging said reinforcement and interlocked with the rough face thereof.

ALVIN W. SPICER.